US008054659B2

(12) United States Patent
Tsuji et al.

(10) Patent No.: US 8,054,659 B2
(45) Date of Patent: Nov. 8, 2011

(54) POWER SUPPLY WITH REDUCED SWITCHING LOSSES BY BLOCKING A FEEDBACK COMPARATOR'S CONTROL SIGNAL

(75) Inventors: Tsuneo Tsuji, Mie (JP); Yoshihiko Miyamoto, Mie (JP)

(73) Assignee: Panasonic Corporation, Osaka (JP)

( * ) Notice: Subject to any disclaimer, the term of this patent is extended or adjusted under 35 U.S.C. 154(b) by 533 days.

(21) Appl. No.: 12/064,906

(22) PCT Filed: Oct. 11, 2006

(86) PCT No.: PCT/JP2006/320256
§ 371 (c)(1),
(2), (4) Date: Feb. 26, 2008

(87) PCT Pub. No.: WO2007/049457
PCT Pub. Date: May 3, 2007

(65) Prior Publication Data
US 2008/0273358 A1    Nov. 6, 2008

(30) Foreign Application Priority Data

Oct. 24, 2005  (JP) .................................. 2005-308165

(51) Int. Cl.
*H02M 7/5395* (2006.01)
(52) U.S. Cl. .......................................... 363/97; 363/41
(58) Field of Classification Search .................... 363/95, 363/97, 98, 89, 131, 132, 40–41; 323/284
See application file for complete search history.

(56) References Cited

U.S. PATENT DOCUMENTS

| 5,930,132 A | * | 7/1999 | Watanabe et al. ........... 363/56.04 |
| 6,744,649 B1 | * | 6/2004 | Yang et al. ....................... 363/98 |
| 7,176,663 B2 | | 2/2007 | Takimoto et al. |

FOREIGN PATENT DOCUMENTS

| JP | 10-295086 A | | 11/1998 |
| JP | 11069781 A | * | 3/1999 |
| JP | 2002-343542 A | | 11/2002 |
| JP | 2004-88818 A | | 3/2004 |
| JP | 2004-088818 A | | 3/2004 |
| JP | 2005-308165 | | 10/2010 |

OTHER PUBLICATIONS

World Intellectual Property Organization (WIPO), Certified priority document, PCT/JP2006/320356, International filing date Oct. 11, 2006, pp. 1-20.*
International Search Report for PCT/JP2006/320256, dated Dec. 26, 2006.

* cited by examiner

*Primary Examiner* — Harry Behm
(74) *Attorney, Agent, or Firm* — RatnerPrestia (57) ABSTRACT

A power supply device includes a first switching element, a second switching element, a transformer having a primary coil, a low-pass filter including an input port connected to the secondary coil, an output terminal connected to an output port of the low-pass filter, a detector for outputting a voltage that follows a voltage at the output terminal, a reference signal generator for generating a reference voltage, a comparator unit for outputting a signal based on a result of comparison between the voltage supplied from the detector and the reference voltage, and an operation pause circuit controlling the first and second switching elements. The operation pause circuit is operable to drive the first and second switching elements according to the signal output from the comparator unit, and to cause the first and second switching elements not to conduct regardless of the signal output from the comparator unit.

4 Claims, 9 Drawing Sheets

POWER SUPPLY WITH REDUCED SWITCHING LOSSES BY BLOCKING A FEEDBACK COMPARATOR'S CONTROL SIGNAL

TECHNICAL FIELD

This application is a U.S. National Phase Application of PCT International Application PCT/JP2006/320256.

The present invention relates to a power supply device that includes a switching element and a transformer.

BACKGROUND ART

Figure 7:
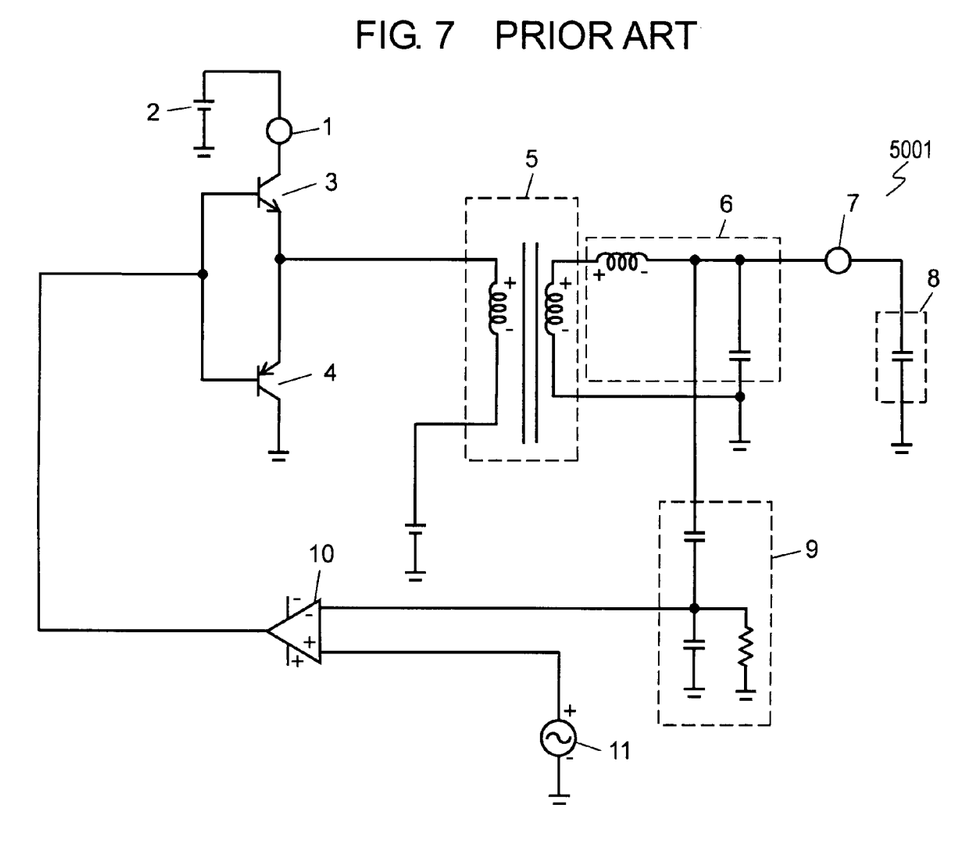
FIG. 7 is a circuit diagram of a conventional power supply device.

FIG. 7 is a circuit diagram of conventional power supply device 5001. Transistors 3 and 4 are connected to direct-current (DC) power supply 2 connected to input terminal 1. A primary coil of transformer 5 is connected to a node at which transistors 3 and 4 are connected. A voltage supplied from a secondary coil of transformer 5 is supplied to low-pass filter 6. A voltage output from low-pass filter 6 is supplied to output terminal 7. Load 8, such as a roller of a printer, is connected to output terminal 7.

Figure 8:
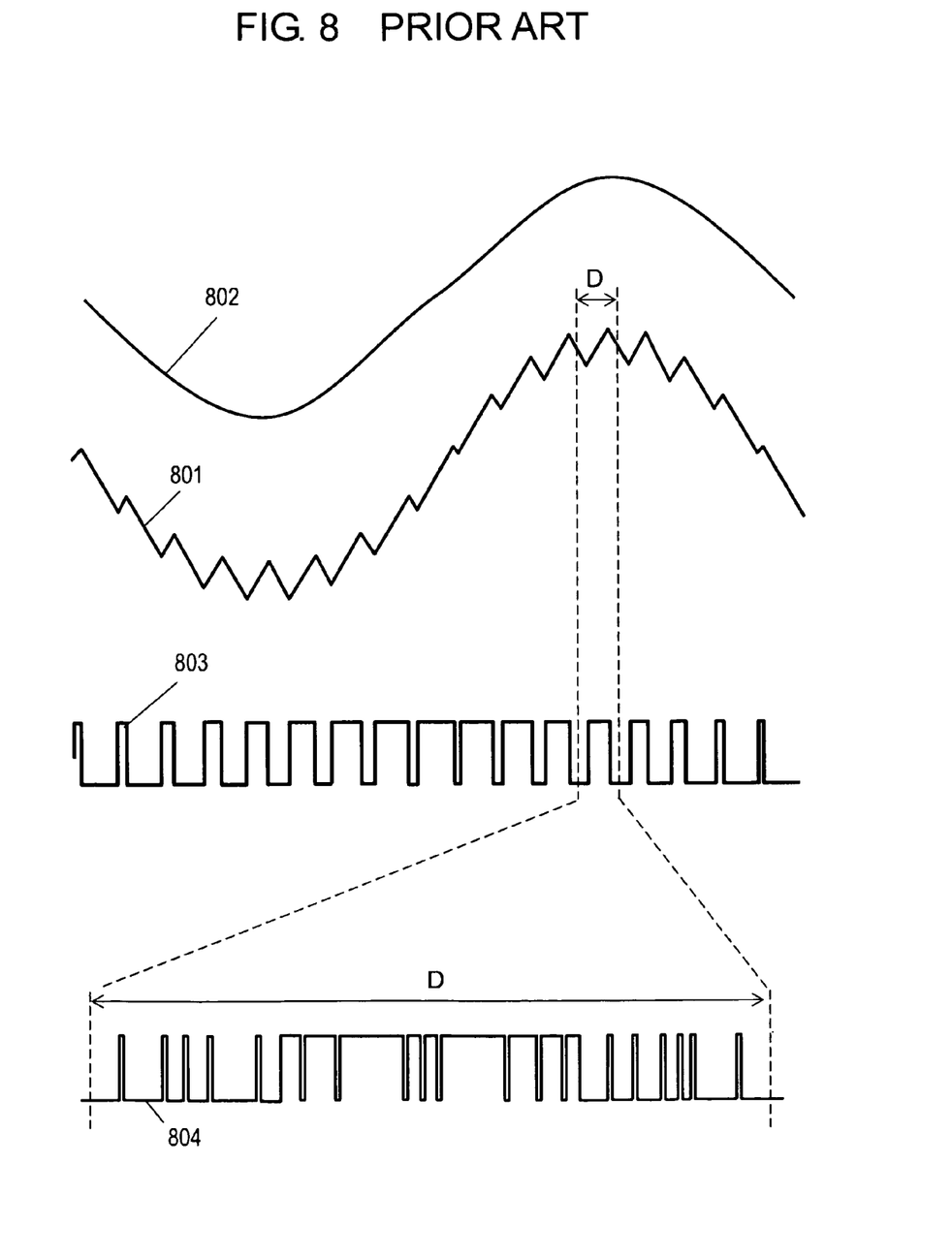
FIG. 8 shows waveforms in the conventional power supply device.

FIG. 8 shows voltages 801 through 804 in power supply device 5001. Voltage 802 is output from output terminal 7. Voltage 803 is a predetermined voltage to be output from output terminal 7. A voltage at output terminal 7 is detected by voltage detector 9 and supplied to a negative input port of comparator 10. Reference signal generator 11 that generates a predetermined alternating-current (AC) voltage is connected to a positive input port of comparator 10. Comparator 10 compares the voltage detected by voltage detector 9 with the voltage output from reference signal generator 11. In other words, when the voltage detected by voltage detector 9 is higher than the voltage output from reference signal generator 11, comparator 10 outputs a voltage at high level. When the voltage detected by voltage detector 9 is lower than the voltage output from reference signal generator 11, comparator 10 outputs a voltage at low level. Thus, comparator 10 output voltage 803. Voltage 803 is supplied to a base of each of transistors 3 and 4. Transistors 3 and 4 connect and disconnect a voltage output from DC power supply 2 to transformer according to voltage 803.

In conventional power supply device 5001, a ripple voltage from voltage detector 9 and reference signal generator 11 is added to voltage 803. Voltage 804 represents voltage 803 in period D. As shown in this figure, one pulse of voltage 803 actually includes a large number of pulses in period D. A voltage having such a large number of pulses is supplied to the bases of switching elements 3 and 4, and thereby, changes between conduction and nonconduction of switching elements 3 and 4 undesirably by times identical to the number of pulses. In other words, transistor 3 conducts by times identical to the number of high-level statuses of the pulses of voltage 803, and transistor 4 conducts by times identical to the number of low-level statuses of voltage 803, thereby increasing a switching loss in transistors 3 and 4.

SUMMARY OF THE INVENTION

A power supply device includes a first switching element arranged to be connected to a DC power supply, a second switching element connected to the first switching element at a node, a transformer having a primary coil connected to the node and a secondary coil, a low-pass filter including an input port connected to the secondary coil, an output terminal connected to an output port of the low-pass filter, a detector for outputting a voltage that follows a voltage at the output terminal, a reference signal generator for generating a reference voltage, a comparator unit for outputting a signal based on a result of comparison between the voltage supplied from the detector and the reference voltage, and an operation pause circuit controlling the first and second switching elements. The operation pause circuit is operable to drive the first and second switching elements according to the signal output from the comparator unit, and to cause the first and second switching elements not to conduct regardless of the signal output from the comparator unit.

This power supply device has a small switching loss in the switching elements.

REFERENCE MARKS IN THE DRAWINGS

12 Input Terminal
13 Direct-Current (DC) Power Supply
14 NPN Transistor (First Switching Element)
15 PNP Transistor (Second Switching Element)
16 Transformer
16A Primary Coil
16B Secondary Coil
19 Low-Pass Filter
20 Output Terminal
24 Voltage Detector (Detector)
25 Comparator
26 Reference Signal Generator
30 Pulse Generator
31 Operation Pause Circuit
51 Node
125 Comparator unit
131 Driver
1001 Power Supply Device

DETAILED DESCRIPTION OF THE PREFERRED EMBODIMENTS

Exemplary Embodiment 1

Figure 1A:
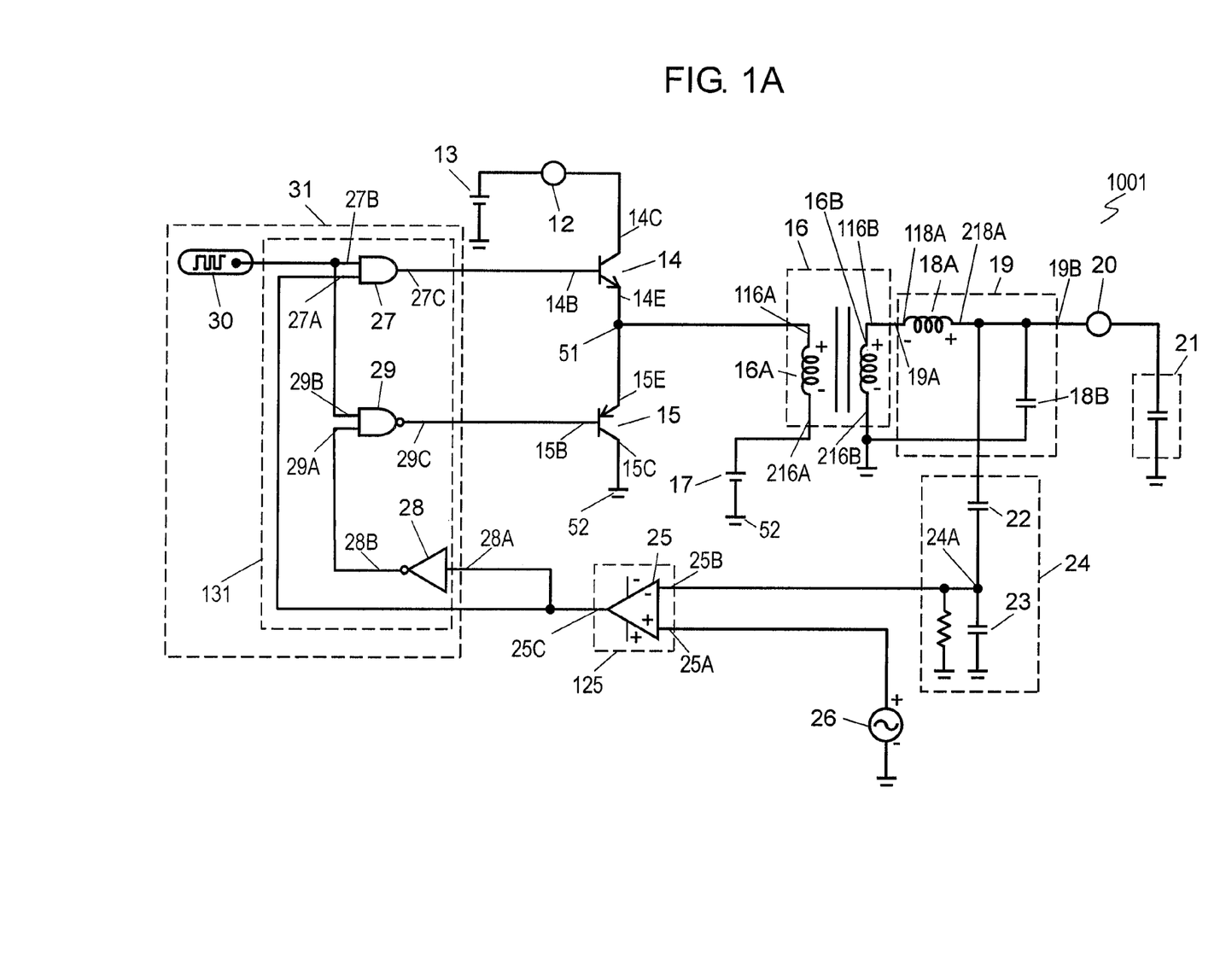
FIG. 1A is a circuit diagram of a power supply device in accordance with Exemplary Embodiment 1 of the present invention.

FIG. 1A is a circuit diagram of power supply device 1001 in accordance with Exemplary Embodiment 1 of the present invention. Input terminal 12 is arranged to be connected to direct-current (DC) power supply 13. Collector 14C of NPN transistor 14, a switching element capable of conducting and nonconducting, is connected to input terminal 12. Emitter 15E of PNP transistor 15, a switching element capable of conducting and nonconducting, is connected to emitter 14E of transistor 14 at node 51. Collector 15C of transistor 15 is connected to ground 52. Positive end 116A of primary coil 16A of transformer 16 is connected to node 51. Power supply 17 for setting an operating point is connected to negative end 216A of primary coil 16A. Power supply 17 fixes an electric potential at positive end 216A of primary coil 16A of transformer 16 to a potential between an electric potential at input terminal 12 and ground 52, for example, to a half the electric potential at input terminal 12. Input port 19A of low-pass filter 19 is connected to positive end 116B of secondary coil 16B of transformer 16. Output port 19B of low-pass filter 19 is connected to output terminal 20. Negative end 216B of secondary coil 16B is connected to ground 52. Low-pass filter 19 includes coil 18A and capacitor 18B. End 118A of coil 18A is connected to input port 19A. End 218A is connected to output port 19B. Capacitor 18B is connected between end 218A of coil 18A and ground 52. Load 211 such as a charged roller of a printer, is connected to output terminal 20. Capacitors 22 and 23 connected in series to each other at node 24A are connected between output terminal 20 and ground 52. Capacitors 22 and 23 constitutes voltage detector 24 that outputs, from node 24A, a voltage following the voltage at output terminal 20, that is, a voltage proportional to the voltage at output terminal 20. The voltage at node 24A output from voltage detector 24 is supplied to negative input port 25B of comparator 25 that constitutes comparator unit 125. Reference signal generator 26 is connected to positive input port 25A of comparator 25. The reference signal generator is an alternating-current voltage source that outputs a desired reference voltage to be output from output terminal 20.

Comparator 25 outputs a voltage, a signal, based on the result of comparison between the voltage at negative input port 25B and the voltage at positive input port 25A. Specifically, when the voltage at negative input port 25B is lower than the voltage at positive input port 25A, comparator 25 outputs a voltage at high level from output port 25C. When the voltage at negative input port 25B is higher than the voltage at positive input port 25A, the comparator outputs, from output port 25C, a voltage at low level which is lower than the voltage at high level. Output port 25C of comparator 25 is connected to input port 27A of AND circuit 27 and input port 28A of NOT circuit 28. Input port 29A of NAND circuit 29 is connected to output port 28B of NOT circuit 28. Output port 27C of AND circuit 27 and output port 29C of NAND circuit 29 are connected to base 14B of transistor 14 and base 15B of transistor 151 respectively. Pulse generator 30 is connected to input port 27B of AND circuit 27 and input port 29B of NAND circuit 29. AND circuit 27, NOT circuit 28, and NAND circuit 29 constitute driver 131 for driving transistors 14 and 15. Driver 131 and pulse generator 30 constitute operation pause circuit 31.

Figure 2:
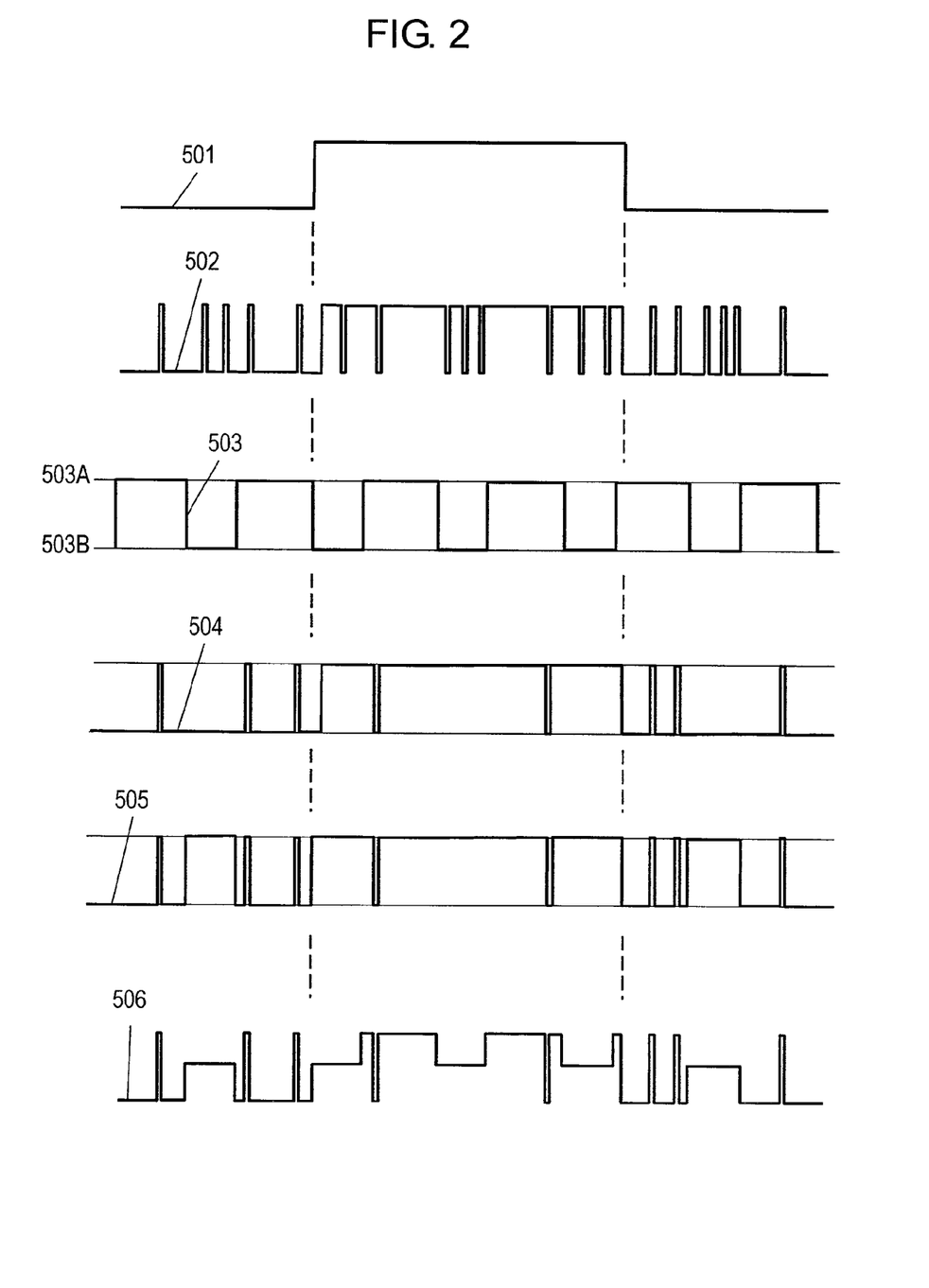
FIG. 2 shows operation waveforms in the power supply device in accordance with Embodiment 1.

An operation of power supply device 1001 will be described below. FIG. 2 shows voltages 501 to 506 in the power supply device.

A current supplied from DC power supply 13 flows to collector 14C of transistor 14 via input terminal 12. The voltage at base 14B of transistor 14, upon being at high level causes the voltage at base 15B of transistor 15 to be at high level. The voltage at base 14B of transistor 14, upon being at low level, causes the voltage at base 15B of transistor 15 to be at low level.

When the voltages at bases 14B and 15B of transistors 14 and 15 are at high level, transistor 14 conducts between collector 14C and emitter 14E, and transistor 15 conducts between emitter 15E and collector 15C. In this status, the current from DC power supply 13 flows through collector 14C and emitter 14E of transistor 14 to power supply 17. At this moment, the current flows through primary coil 16A of transformer 16 from positive end 116A to negative end 216A, thereby inducing a positive potential at positive end 116B of secondary coil 16B.

When the voltages at bases 14B and 15B of transistors 14 and 15 are at low level, transistor 14 does not connect between collector 14C and emitter 14E, and transistor 15 does not connect between emitter 15E and collector 15C. In this status, the current from power supply 17 flows through emitter 15E and collector 15C of transistor 15 to ground 52. At this moment, the current flows through primary coil 16A of transformer 16 from negative end 216A to positive end 116A, thereby inducing a negative potential at positive end 116B of secondary coil 16B.

In power supply device 1001, power supply 17 is a voltage source for outputting a positive voltage. However, depending on the circuit structure, the power supply for setting an operating point may be a voltage source for outputting a negative voltage, or a voltage source for outputting a grounding voltage, 0V.

Figure 1B:
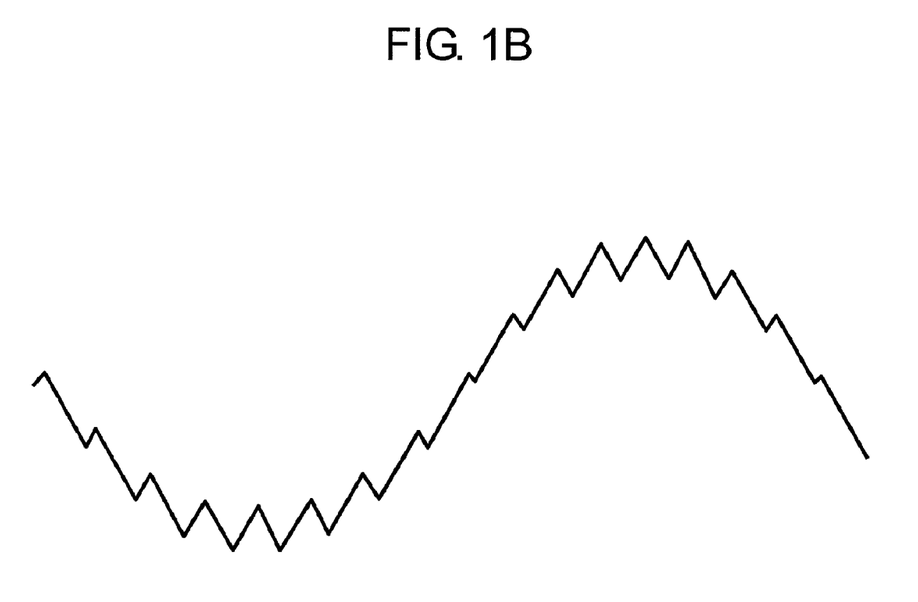
FIG. 1B shows a voltage output from the power supply device in accordance with Embodiment 1.

The voltage produced between positive end 116B and negative end 216B of secondary coil 16B is supplied to input port 19A of low-pass filter 19. Low-pass filter 19 eliminates high-frequency components of the supplied voltage and outputs the voltage from output port 19B through output terminal 20. The voltage output from output terminal 20 has a sine-curve waveform having a sawtooth wave added thereto, as shown in FIG. 1B.

The voltage at output terminal 20 is divided by capacitors 22 and 23 that constitute voltage detector 24. The divided voltage is supplied to negative input port 25B of comparator 25 from node 24A. A desired voltage waveform is supplied from reference signal generator 26 to positive input port 25A of comparator 25.

When the voltage of reference signal generator 26 is higher than the voltage at node 24, comparator 25 outputs a voltage at high level from output port 25C. When the voltage of reference signal generator 26 is lower than the voltage at node 24A, the comparator outputs a voltage at low level from output port 25C. Under the above conditions regarding the voltages, comparator 25 ideally outputs rectangular voltage 501 shown in FIG. 2. However, a ripple voltage from voltage detector 24 and reference signal generator 26 is added, and causes the comparator to output voltage 502.

Voltage 502 is supplied to input port 27A of AND circuit 27 and input port 28A of NOT circuit 28 of operation pause circuit 31 that determines the voltages of base 14B of transistor 14 and base 15B of transistor 15. Input port 29A of NAND circuit 29 is connected to output port 28B of NOT circuit 28. Pulse generator 30 generates voltage 503, a signal having active level 503A and inactive level 503B alternately repeated. This signal is supplied to input port 27B of AND circuit 27 and input port 29B of NAND circuit 29.

AND circuit 27 outputs voltage 504. When voltage 502 output from comparator 25 is at high level and voltage 503 output from pulse generator 30 is at high level, i.e. active level 503A, AND circuit 27 outputs a voltage at high level from output port 27C and causes transistor 14 to connect between collector 14C and emitter 14E. When at least one of voltage 502 output from comparator 25 and voltage 503 output from pulse generator 30 is at low level, AND circuit 27 outputs a voltage at low level from output port 27C, and causes transistor 14 to disconnect between collector 14C and emitter 14E.

NAND circuit 29 outputs voltage 505. When voltage 502 output from comparator 25 is at low level and voltage 503 output from pulse generator 30 is at high level, NAND circuit 29 outputs a voltage at low level from output port 29C and causes transistor 15 to connect between collector 15C and emitter 15E. When voltages 502 and 503 are in a status other than the status described above, NAND circuit 29 outputs a voltage at high level from output port 29C, and causes transistor 15 to disconnect between collector 15C and emitter 15E.

When voltage 503 output from pulse generator 30 is at low level, i.e. inactive level 503B, voltage 504 at output port 27C of AND circuit 27 is at low level, and voltage 505 at output port 29C of NAND circuit 29 is at high level regardless of voltage 502 output from comparator 25. In other words, when voltage 503 output from pulse generator 30 is at low level, transistor 14 disconnects between collector 14C and emitter 14E, and transistor 15 disconnects between collector 15C and emitter 15E, regardless of voltage 502 output from comparator 25.

That is, driver 131 drives transistors 14 and 15 according to the signal output from comparator unit 125 when the signal (voltage 503) output from pulse generator 30 is at active level 503A. Driver 131 causes transistors 14 and 15 not to conduct when the signal (voltage 503) output from pulse generator 30 is at inactive level 503B.

When voltage 504 at output port 27C of AND circuit 27 supplied to base 14B of transistor 14 and voltage 505 at output port 29C of NAND circuit 29 is supplied to base 15B of transistor 15, voltage 506 is supplied to positive end 116A of primary coil 16A of transformer 16.

In this structure, even when a ripple voltage is added to voltage 502 output from comparator 25, transistors 14 and 15 operate not only according to voltage 502. When voltage 503 output from pulse generator 30 of operation pause circuit 31 is at high level, i.e. active level 503A, driver 131 drives transistors 14 and 15 according to voltage 502 output from comparator 25, and feeds back the voltage at output terminal 20 so as to change the voltage according to the voltage of reference signal generator 26. When voltage 503 output from pulse generator 30 is at low level, i.e. inactive level 503B, driver 131 causes transistors 14 and 15 not to conduct. This operation reduces the number of changes between conduction and nonconduction of transistors 14 and 15 and allows power supply device 1001 to produce less switching loss at the changes between conduction and nonconduction than a power supply device including transistors 14 and 15 operating only according to voltage 502.

Coil 18A may not necessarily be an independent coil, and may be a leakage inductance of transformer 16 instead. Capacitor 18B may not necessarily be an independent capacitor, and may be a capacitance component of load 21 to be connected to output terminal 20 instead.

A low-pass filter similar to low-pass filter 19 may be connected in series to primary coil 16A.

Exemplary Embodiment 2

Figure 3:
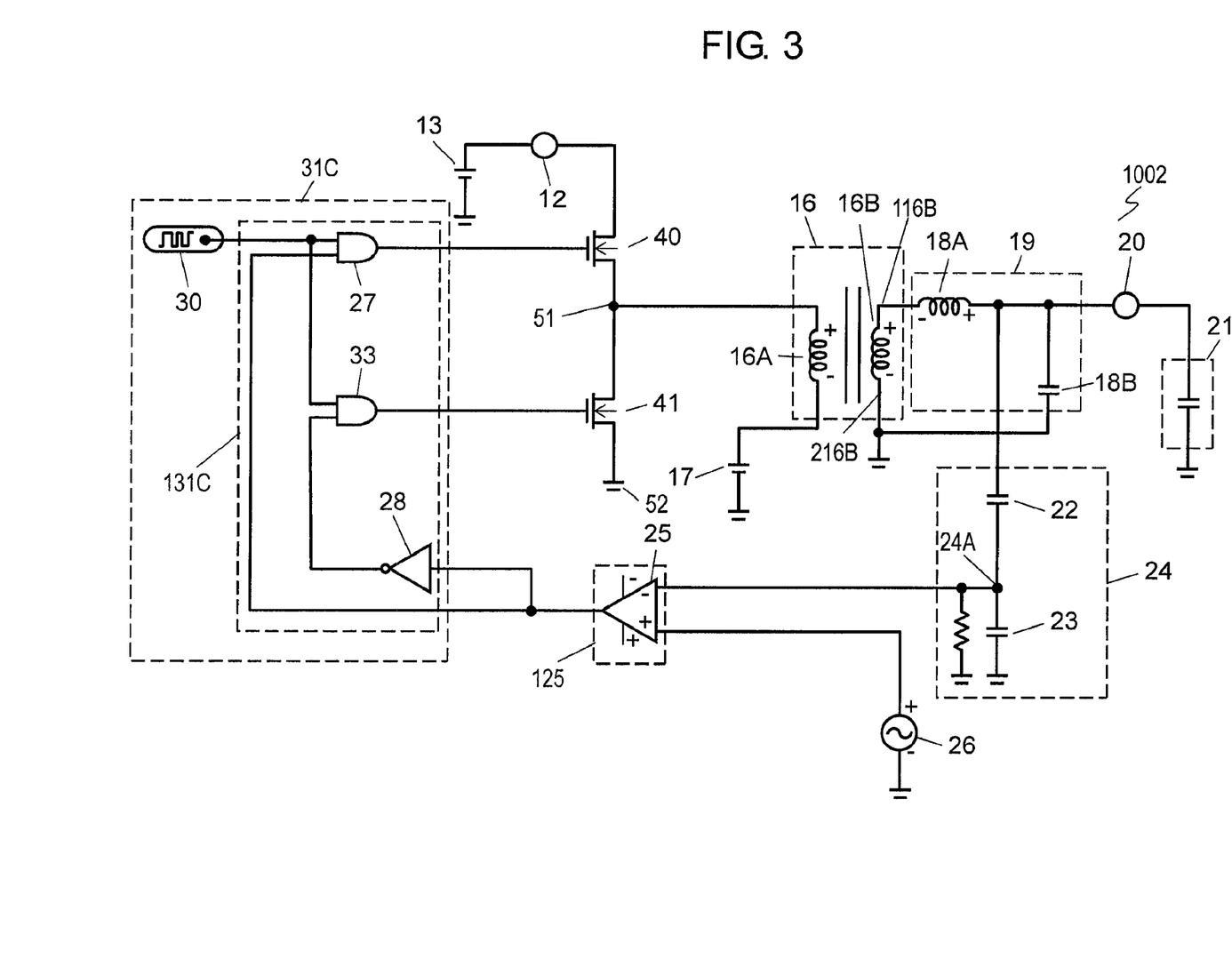
FIG. 3 is a circuit diagram of a power supply device in accordance with Exemplary Embodiment 2 of the invention.

FIG. 3 is a circuit diagram of power supply device 1002 in accordance with Exemplary Embodiment 2 of the present invention. In FIG. 3, the components identical to those of power supply device 1001 according to Embodiment 1 shown in FIG. 1 are denoted by the same reference numerals, and their description will be omitted.

Power supply device 1002 show in FIG. 3 includes N-channel field-effect transistors (FETs) 40 and 41 as switching elements instead of transistors 14 and 15 of power supply device 1001 shown in FIG. 1. A gate, drain, and source of FET 40 are connected positions connected to base 14B, collector 14C, and emitter 14E of transistor 14 of power supply device 1001 of FIG. 1, respectively. A gate, drain, and source of FET 41 are connected to positions connected to base 15B, collector 15C, and emitter 15E of transistor 15 of power supply device 1001 of FIG. 1, respectively. In other words, the source of FET 40 and the drain of FET 41 are connected to each other at node 51. When a voltage at the gate of FET 41 is at high level, FET 41 connects between the drain and source thereof. Thus, this power supply device includes driver 131C including AND circuit 33 instead of driver 131 including NAND circuit 29 of power supply device 1001 shown in FIG. 1A. Operation pause circuit 31C includes pulse generator 30 and driver 131C.

FETs 40 and 41 have switching speeds larger than those of transistors 14 and 15, and accordingly, reduces a switching loss in power supply device 1002 in comparison with a power supply device including the transistors.

Each of N-channel FETs 40 and 41 includes a parasitic diode connected between the source and the drain thereof, preventing the voltage at node 51 from exceeding the voltage of direct-current (DC) power supply 13, and preventing the voltage at node 51 from being lower than ground 52. Thus, FETs 40 and 41 are protected from a back electromotive force induced in transformer 16.

Similar to power supply device 1001 of Embodiment 1 shown in FIG. 1A, in power supply device 1002 of FIG. 3, even when a ripple voltage is added to the voltage output from comparator 25 that constitutes comparator unit 125, FETs 40 and 41 operate not only according to the voltage output from comparator 25. When the voltage output from pulse generator 30 of operation pause circuit 31C is at high level, FETs 40 and 41 operate according to the voltage output from comparator 25, and feeds back the voltage at output terminal 20 so as to change the voltage according to the voltage of reference signal generator 26. When the voltage output from pulse generator 30 is at low level, both FETs 40 and 41 do not conduct. This operation allows power supply device 1002 to produce less switching loss at the changes between conduction and nonconduction of FETs 40 and 41 than a power supply device including transistors 14 and 15 operating only according to voltage 502 shown in FIG. 2.

Exemplary Embodiment 3

Figure 4:
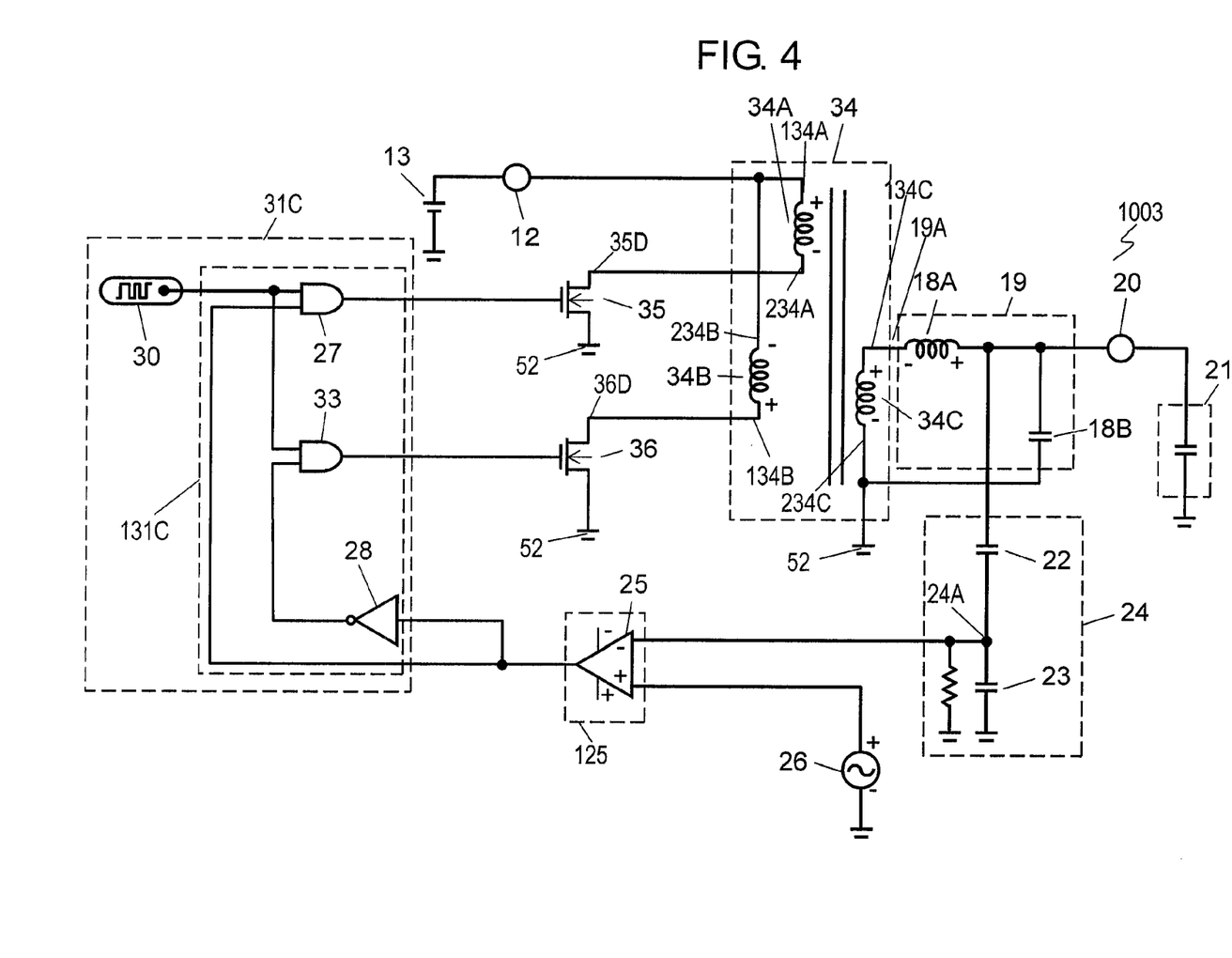
FIG. 4 is a circuit diagram of a power supply device in accordance with Exemplary Embodiment 3 of the invention.

FIG. 4 is a circuit diagram of power supply device 1003 in accordance with Exemplary Embodiment 3 of the present invention. In FIG. 4 components identical to those of power supply device 1002 of Embodiment 2 shown in FIG. 3 are denoted by the same reference numerals, and their description will be omitted.

Power supply device 1003 includes field-effect transistors (FETs) 35 and 36 and transformer 34 instead of FETs 40 and 41 and transformer 16 of power supply device 1002 shown in FIG. 3. Transformer 34 includes two primary coils 34A and 34B and secondary coil 34C. Positive end 134A of primary coil 34A and negative end 234B of primary coil 34B are connected to input terminal 12 arranged to be connected to direct-current (DC) power supply 13. Negative end 234A of primary coil 34A is connected to drain 35D of FET 35. Positive end 134B of primary coil 34B is connected to drain 36D of FET 36. Similar to positive end 116B and negative end 216B of secondary coil 16B of transformer 16 shown in FIG. 3, positive end 134C and negative end 234C of secondary coil 34C are connected to input port 19A of low-pass filter 19 and ground 52, respectively. Ground 52 connected to the sources of FETs 35 and 36 functions as power supply 17 for setting an operating point of Embodiment 2 shown in FIG. 3.

An operation of power supply device 1003 will be described below.

When a voltage output supplied from reference signal generator 26 is higher than a voltage at node 24A of voltage detector 24, comparator 25 constituting comparator unit 125 outputs a voltage at high level. At this moment, when pulse generator 30 outputs a voltage at high level, i.e. an active level, AND circuit 27 outputs a voltage at high level. When AND circuit 27 outputs a voltage at high level to the gate of N-channel FET 35, FET 35 conducts, and allows a current to flow from DC power supply 13 toward ground 52 connected to the source of FET 35. At this moment, the current flows through primary coil 34A of transformer 34 from positive end 134A to negative end 234A, thereby inducing a positive potential at positive end 134C of secondary coil 34C.

When the reference voltage output from reference signal generator 26 is lower than the voltage at node 24A of voltage detector 24, comparator 25 outputs a voltage at low level. At this moment, when pulse generator 30 outputs a voltage at high level, i.e. an active level, AND circuit 33 outputs a voltage at high level. When AND circuit 33 outputs the voltage at high level to the gate of N-channel FET 36, FET 36 conducts, and allows a current to flow from DC power supply 13 toward ground 52 connected to the source of FET 36. At this moment, the current flows through primary coil 34B of transformer 34 from negative end 234B to positive end 134B, thereby inducing a negative potential at the positive end of secondary coil 34C.

Negative end 234B of primary coil 34B is connected to positive end 134A of primary coils 34A. Thus, primary coils 34A and 34B are connected in series with each other to constitute one primary coil. A voltage between both ends of the one primary coil, i.e. between negative end 234A and positive end 134B, is twice the voltage between both ends of primary coil 16A of Embodiment 2 shown in FIG. 3. Thus, even if the number of turns of secondary coil 34C is a half the number of turns of secondary coil 16B of transformer 16 according to Embodiment 2, a voltage identical to the voltage of secondary coil 16B shown in FIG. 3 is induced across secondary coil 34C. Since the voltage across the primary coil is doubled, even a half current provides the same power. Consequently, the current flowing through primary coils 34A and 34B is reduced to a half the current flowing through primary coil 16A of FIG. 3, accordingly reducing temperature rises of primary coils 34A and 34B and FETs 35 and 36 to be smaller than temperature rises of primary coil 16A and FETs 40 and 41 shown in FIG. 3.

When the voltage output from pulse generator 30 is at low level, i.e. an inactive level, AND circuits 27 and 33 supply voltages at low level to the gates of FETs 35 and 36, respectively, regardless of the voltage output from comparator 25. This operation disconnects between the source and drain of each of FETs 35 and 36.

Therefore, similar to power supply device 1002 of Embodiment 2 shown in FIG. 3, in power supply device 1003 shown in FIG. 4, even when a ripple voltage is added to the voltage output from comparator 25, FETs 35 and 36 operate not only according to the voltage output from comparator 25. When the voltage output from pulse generator 30 of operation pause circuit 31C is at high level, i.e. an active level, driver 131C drives FETs 35 and 36 according to the voltage output from comparator 25, and feeds back the voltage at output terminal 20 so as to change the voltage according to the voltage of reference signal generator 26. When the voltage output from pulse generator 30 is at low level, i.e. an inactive level, driver 131C causes both FETs 35 and 36 not to conduct regardless of the voltage output from comparator unit 125. This operation allows power supply device 1003 to produce less switching loss at changes between conduction and non-conduction of FETs 35 and 36 than a power supply device including transistors 14 and 15 operating only according to voltage 502 shown in FIG. 2.

Exemplary Embodiment 4

Figure 5:
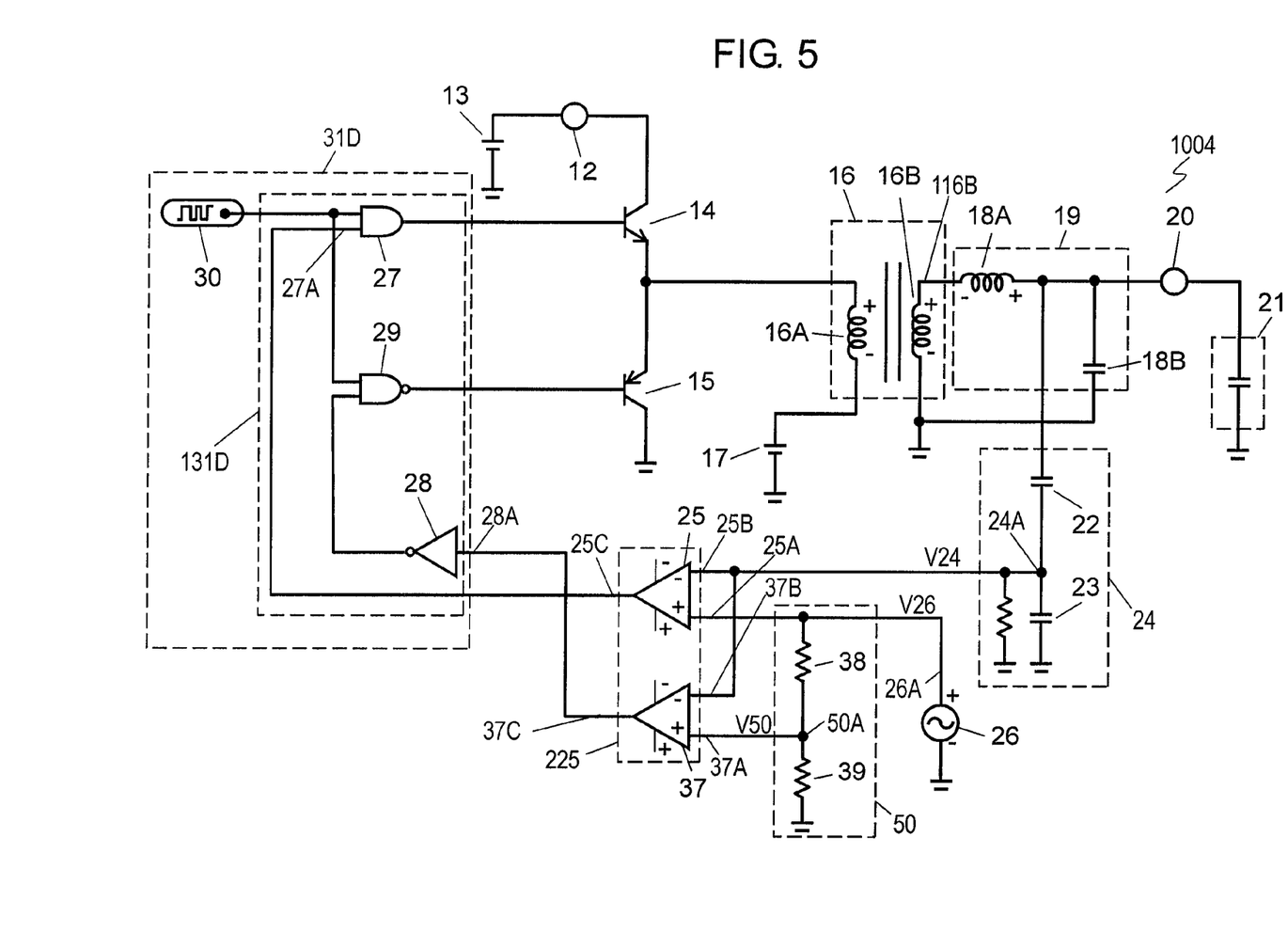
FIG. 5 is a circuit diagram of a power supply device in accordance with Exemplary Embodiment 4 of the invention.

FIG. 5 is a circuit diagram of power supply device 1004 in accordance with Exemplary Embodiment 4 of the present invention. In FIG. 5, components identical to those of power supply device 1001 of Embodiment 1 shown in FIG. 1A are denoted by the same reference numerals, and their description will be omitted. Power supply device 1004 further includes comparator 37 and resistors 38 and 39. Comparators 25 and 37 constitute comparator unit 225. AND circuit 27, NAND circuit 29, and NOT circuit 28 constitute driver 131D. Operation pause circuit 31D includes pulse generator 30 and driver 131D.

Negative input port 25B of comparator 25 and negative input port 37B of comparator 37 are connected to node 24A at which capacitor 22 and capacitor 23 of voltage detector 24 are connected. One end of resistor 38 is connected to output port 26A of reference signal generator 26. One end of resistor 39 is connected to the other end of resistor 38 at node 50A in series to resister 38. The other end of resistor 39 is connected to ground 52. Resistors 38 and 39 constitute voltage divider 50 that divides the reference voltage output from reference signal generator 26 and outputs the divided voltage from node 50A. Positive input port 37A of comparator 37 is connected to node 50A. Comparator 25 outputs a voltage, a signal based on the result of comparison between the voltage at negative input port 25B and the voltage at positive input port 25A. Comparator 37 outputs a voltage, a signal based on the result of comparison between the voltage at negative input port 37B and the voltage at positive input port 37A.

Output port 25C of comparator 25 is connected to NOT circuit 28, but connected to input port 27A of AND circuit 27. Output port 37C of comparator 37 is connected to input port 28A of NOT circuit 28.

An operation of power supply device 1004 will be described below.

When reference voltage V26 output from reference signal generator 26 is higher than voltage V24 at node 24A of voltage detector 24 and when voltage V50 at node 50A of voltage divider 50 provided by dividing reference voltage V26 is higher than voltage V24, both comparators 25 and 37 output voltages high level. At this moment, when pulse generator 30 outputs a voltage at high level, i.e. an active level, AND circuit 27 of driver 131D inputs a voltage at high level to the base of NPN transistor 14, and NAND circuit 29 inputs a voltage at high level to the base of PNP transistor 15. This operation connects between the collector and emitter of transistor 14, and disconnects between the collector and emitter of transistor 15, thereby inducing a positive potential at positive end 116B of secondary coil 16B of transformer 16.

When reference voltage V26 of reference signal generator 26 is lower than voltage V24 at node 24A of voltage detector 24 and when voltage V50 at node 50A of voltage divider 50 provided by dividing reference voltage V26 is lower than voltage V26, both comparators 25 and 37 output voltages at low level. At this moment, when pulse generator 30 outputs a voltage at high level, i.e. an active level, AND circuit 27 of driver 131D inputs a voltage at low level to the base of NPN transistor 14, and NAND circuit 29 inputs a voltage at low level to the base of PNP transistor 15. This operation connects between the collector and emitter of transistor 15, and disconnects between the collector and emitter of transistor 14, thereby inducing a negative potential at positive end 116B of secondary coil 16B of transformer 16.

When reference voltage V26 output from reference signal generator 26 is lower than voltage V24 at node 24A of voltage detector 24 and when voltage V50 at node 50A of voltage divider 50 provided by dividing reference voltage V26 is higher than voltage V24, comparator 25 outputs a voltage at low level, and comparator 37 outputs a voltage at high level. At this moment, AND circuit 27 inputs a voltage at low level to the base of NPN transistor 14, and NAND circuit 29 inputs a voltage at high level to the base of PNP transistor 15 regardless of the voltage output from pulse generator 30. This operation disconnects between the collector and emitter of each of transistors 14 and 15.

In this structure, even if reference voltage V26 of reference signal generator 26 drops from a voltage higher than voltage V24 at node 24A of voltage detector 24 to a voltage lower than voltage V24, transistor 15 does not connect between the collector and emitter thereof unless voltage V50 is lower than voltage V24. When voltage V50 becomes lower than voltage V24, transistor 15 connects between the collector and emitter thereof. Even if voltage V50 provided by dividing reference voltage V26 rises from a voltage lower than voltage V24 at node 24A of voltage detector 24 to a voltage higher than voltage V24, transistor 14 does not connect between the collector and emitter thereof unless voltage V26 is higher than voltage V24. When voltage V26 becomes higher than voltage V24, transistor 14 connects between the collector and emitter thereof. Thus, when voltage V24 of voltage detector 24 is higher than voltage V50 of voltage divider 50 and lower then reference voltage V26, transistors 14 and 15 do not conduct, and do not change between conduction and nonconduction regardless of the output from pulse generator 30. This operation reduces the number of switching operations of transistors 14 and 15, accordingly reducing a switching loss produced at changes between conduction and nonconduction.

When pulse generator 30 outputs a voltage at low level, i.e. an inactive level, AND circuit 27 of driver 131D inputs a voltage at low level to the base of NPN transistor 14, and NAND circuit 29 inputs a voltage at high level to the base of PNP transistor 15 regardless of voltage V24 at node 24A of voltage detector 24. Thus, driver 131D disconnects between the collector and emitter of each of transistors 14 and 15 regardless of the voltages outputs from comparators 25 and 37 of comparator unit 225. This operation allows power supply device 1004 to produce less switching loss at changes between conduction and nonconduction of transistors 14 and 15 than a power supply device including transistors 14 and 15 operating only according to voltage 502 shown in FIG. 2.

Exemplary Embodiment 5

Figure 6:
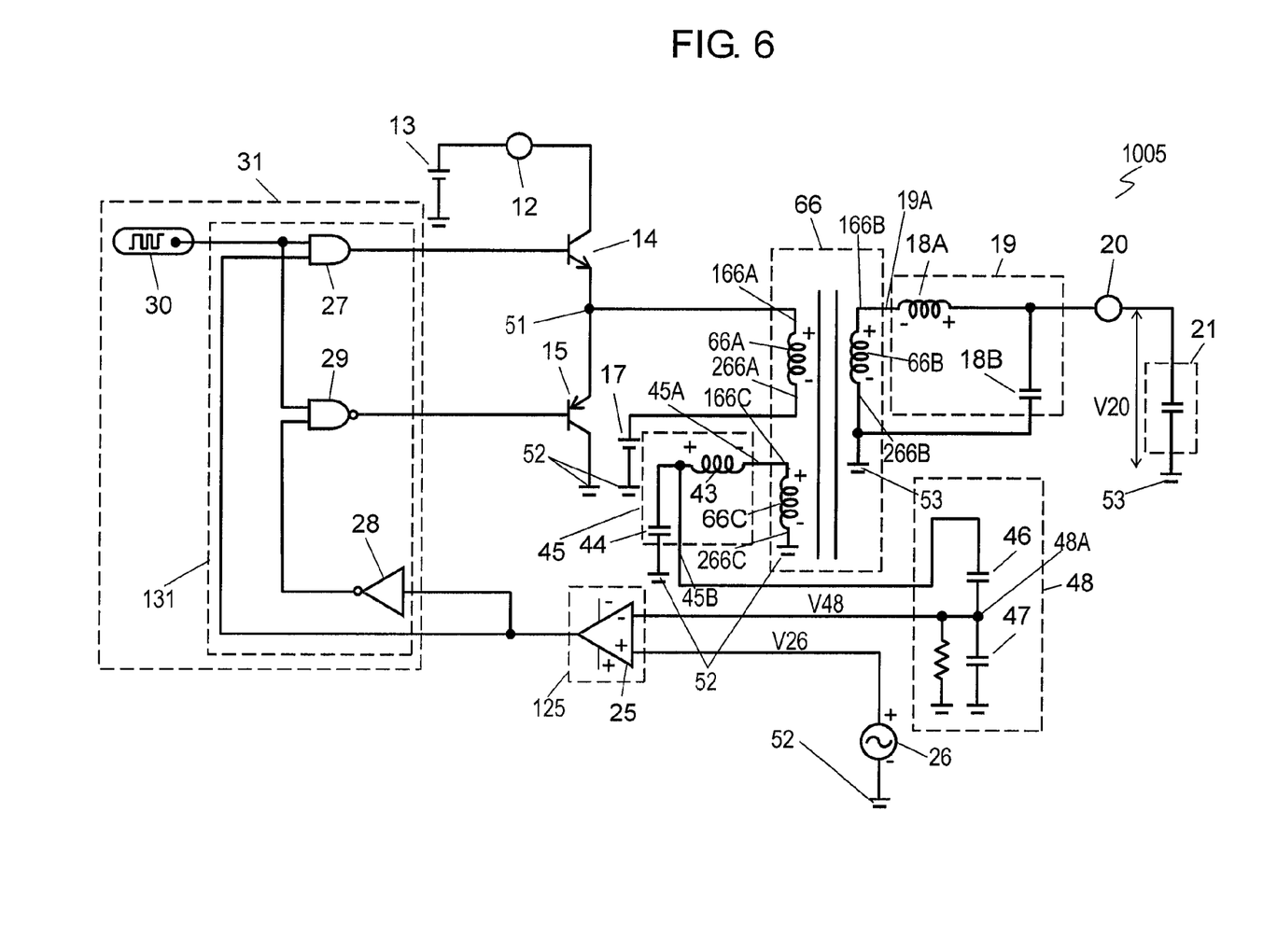
FIG. 6 is a circuit diagram of a power supply device in accordance with Exemplary Embodiment 5 of the invention.

FIG. 6 is a circuit diagram of power supply device 1005 in accordance with Exemplary Embodiment 5 of the present invention. In FIG. 6, components identical to those of power supply device 1001 of Embodiment 1 shown in FIG. 1A are denoted by the same reference numerals, and their description will be omitted. Power supply device 1005 includes transformer 66 and voltage detector 48 instead of transformer 16 and voltage detector 24 of power supply device 1001 shown in FIG. 1A, and further includes low-pass filter 45.

Transformer 66 includes primary coil 66A, and two secondary coils 66B and 66C. Positive end 166A of primary coil 66A is connected to node 51 at which the emitter of transistor 14 is connected to the emitter of transistor 15. Negative end 266A of primary coil 66A is connected to power supply 17 for setting an operating point. Positive end 166B of secondary coil 66B is connected to input port 19A of low-pass filter 19, and negative end 266B is connected to ground 53. Load 21 is connected between output terminal 20 and ground 53.

Positive end 166C of secondary coil 66C of transformer 66 is connected to input port 45A of low-pass filter 45. Negative end 266C is connected to ground 52. Low-pass filter 45 includes output port 45B, coil 43 connected between input port 45A and output port 45B, and capacitor 44 connected between output port 45B and ground 52. Output port 45B of low-pass filter 45 is connected to capacitor 46. Capacitor 47 is connected to capacitor 46 at node 48A and is connected between node 48B and ground 52. Negative end 266C of secondary coil 66C is connected to ground 52. Positive end 166C is connected to negative end of coil 43. The positive end of coil 43 is connected to one end of capacitor 44 and one end of capacitor 46 constituting voltage detector 48. The other end of capacitor 44 is connected to ground 52. The other end of capacitor 46 is connected to capacitor 47. Node 48A at which capacitor 46 and capacitor 47 are connected to each other is connected to the negative input port of comparator 25 constituting comparator unit 125. Capacitors 46 and 47 constitute voltage detector 48 that outputs, from node 48A, voltage V48 proportional to the voltage at output port 45B of low-pass filter 45.

Similar to power supply device 1001 of FIG. 1A, in power supply device 1005, transistors 14 and 15 operate to allow voltage V48 at node 48A of voltage detector 48 to follow voltage V26 of reference signal generator 26. The voltage at output port 45B of low-pass filter 45 follows voltage V20 between output terminal 20 and ground 53. Voltage detector 48 does not detect voltage V20 directly by receiving voltage V20 at output terminal 20, but detects voltage 20 indirectly by receiving the voltage at output port 45B of low-pass filer 45. Even when the voltage at positive end 166B of secondary coil 66B of transformer 66 is excessively higher than the voltage of comparator 25 or reference signal generator 26, capacitor 46 may not have a high withstand voltage. Further, ground 53 connected to secondary coil 66B can be separated from ground 52 connected to secondary coil 66C and transistor 15. Thus, ground 52 of power supply device 1005 can be separated from ground 53 of load 21. Grounds 52 and 53 may be common.

In power supply device 1005, similar to power supply device 1001 shown in FIG. 1A, when pulse generator 30 outputs a voltage at low level, i.e. an inactive level, AND circuit 27 of driver 131 of operation pause circuit 31 inputs a voltage at low level to the base of NPN transistor 14, and NAND circuit 29 inputs a voltage at high level to the base of PNP transistor 15 regardless of voltage V48 at node 48A of voltage detector 48. This operation disconnects between the collector and emitter of each of transistors 14 and 15. This operation allows power supply 1005 to produce less switching loss at changes between conduction and nonconduction of transistors 14 and 15 than a power supply device including transistors 14 and 15 operating only according to voltage 502 shown in FIG. 2.

INDUSTRIAL APPLICABILITY

A power supply device has a small switching loss in the switching elements, and is useful for various electronic devices, such as printers.

The invention claimed is:

1. A power supply device comprising:
   an input terminal arranged to be connected to a direct-current (DC) power supply;
   a first switching element connected to the input terminal;
   a second switching element connected to the first switching element at a node;
   a transformer having a primary coil and a secondary coil, the primary coil being connected to the node;
   a low-pass filter including an output port and an input port connected to the secondary coil;
   an output terminal connected to the output port of the low-pass filter;
   a detector for outputting a voltage that follows a voltage at the output terminal;
   a reference signal generator for generating a reference voltage;
   a comparator unit for outputting a signal based on a result of comparison between the voltage supplied from the detector and the reference voltage; and
   an operation pause circuit operable to:
      during a first period, cause the first switching element and the second switching element not to conduct regardless of the signal output from the comparator unit, and
      during a second period, cause one of the first switching element and the second switching element to conduct and a remaining one of the first switching element and the second switching element not to conduct based on a level of the signal output from the comparator unit,
      wherein the operation pause circuit includes
         a pulse generator for generating a signal having an active level and an inactive level which are alternately repeated, the inactive level and the active level respectively corresponding to the first period and the second period, and
         a driver operable to
            drive the first switching element and the second switching element according to the signal output from the comparator unit when the signal output from the pulse generator is at the active level, and
            cause the first switching element and the second switching element not to conduct when the signal output from the pulse generator is at the inactive level.

2. The power supply device of claim 1, wherein the low-pass filter further includes
   a coil connected between the input port and the output port; and
   a capacitor connected to the output port.

3. The power supply device of claim 1, wherein
   the comparator unit is operable to
      output a signal of a first level when the voltage output from the detector is higher than the reference voltage, and
      output a signal of a second level when the voltage output from the detector is lower than the reference voltage, and
   the driver is operable to
      when the signal output from the pulse generator is at the active level and the comparator unit outputs the signal of the first level, cause the first switching element to conduct and cause the second switching element not to conduct, and
      when the signal output from the pulse generator is at the active level and the comparator unit outputs the signal of the second level, cause the first switching element not to conduct and cause the second switching element to conduct.

4. A power supply device comprising:
   an input terminal arranged to be connected to a direct-current (DC) power supply;
   a first switching element connected to the input terminal;
   a second switching element connected to the first switching element at a node;
   a transformer having a primary coil and a secondary coil, the primary coil being connected to the node;
   a low-pass filter including an output port and an input port connected to the secondary coil;
   an output terminal connected to the output port of the low-pass filter;
   a detector for outputting a voltage that follows a voltage at the output terminal;
   a reference signal generator for generating a reference voltage;
   a comparator unit for outputting a signal based on a result of comparison between the voltage supplied from the detector and the reference voltage; and
   an operation pause circuit operable to
      during a first period, cause the first switching element and the second switching element not to conduct regardless of the signal output from the comparator unit, and
      during a second period, cause one of the first switching element and the second switching element to conduct and a remaining one of the first switching element and the second switching element not to conduct based on a level of the signal output from the comparator unit,
   wherein
   the comparator unit is operable to
      output a signal of a first level when the voltage output from the detector is higher than the reference voltage, and
      output a signal of a second level when the voltage output from the detector is lower than the reference voltage, and
   the operation pause circuit is operable to
      during the second period, cause the first switching element to conduct and cause the second switching element not to conduct when the comparator unit outputs the signal of the first level, and
      during the second period, cause the first switching element not to conduct and cause the second switching element to conduct when the comparator unit outputs the signal of the second level.

* * * * *